United States Patent
Lee et al.

(10) Patent No.: US 11,440,439 B2
(45) Date of Patent: Sep. 13, 2022

(54) METHOD FOR CONTROLLING VEHICLE SEAT

(71) Applicant: HYUNDAI TRANSYS INC., Seosan-si (KR)

(72) Inventors: Jin Woo Lee, Hwaseong-si (KR); Seung Kyu Lee, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 413 days.

(21) Appl. No.: 16/716,107

(22) Filed: Dec. 16, 2019

(65) Prior Publication Data

US 2020/0189419 A1 Jun. 18, 2020

(30) Foreign Application Priority Data

Dec. 18, 2018 (KR) .......................... 10-2018-0164003

(51) Int. Cl.
*B60N 2/02* (2006.01)
*B60N 2/20* (2006.01)
*B60N 2/06* (2006.01)

(52) U.S. Cl.
CPC ............. *B60N 2/0244* (2013.01); *B60N 2/06* (2013.01); *B60N 2/20* (2013.01); *B60N 2002/0256* (2013.01); *B60N 2002/0272* (2013.01)

(58) Field of Classification Search
CPC .......... B60N 2/0244; B60N 2/06; B60N 2/20; B60N 2002/0256; B60N 2002/0272
See application file for complete search history.

(56) References Cited

U.S. PATENT DOCUMENTS

2011/0042993 A1* 2/2011 Maeda ................. B60N 2/0244
    296/65.01
2017/0341529 A1* 11/2017 Uno ......................... B60N 2/01

FOREIGN PATENT DOCUMENTS

| CN | 201619470 U | 11/2010 |
|---|---|---|
| CN | 101992712 A | 3/2011 |
| DE | 102007019442 A1 | 10/2008 |
| DE | 60037567 T2 | 12/2008 |

(Continued)

OTHER PUBLICATIONS

Office Action received for Korean Patent Application No. 10-2018-0164003, dated Mar. 20, 2020, 5 pages of Original Document Only.

(Continued)

*Primary Examiner* — Peter D Nolan
*Assistant Examiner* — Tarek Elarabi
(74) *Attorney, Agent, or Firm* — Womble Bond Dickinson (US) LLP

(57) ABSTRACT

A method of controlling a vehicle seat according to an example of the present disclosure includes analyzing, by a controller, input information transmitted through each switch mounted in a vehicle and classifying the input information according to an input pattern; detecting, by the controller, in which angle range among the plurality of angle ranges belongs the current angle of the seat by analyzing rotation angle information transmitted through the angle detecting sensor of the corresponding seat; controlling, by the controller, an operation of the corresponding seat by using the information of the detected angle range and the input information; and determining, by the controller, whether the operation to the corresponding seat is correct or not.

3 Claims, 4 Drawing Sheets

(56) References Cited

FOREIGN PATENT DOCUMENTS

| | | |
|---|---|---|
| DE | 102017208847 A1 | 11/2017 |
| EP | 2287034 A2 | 2/2011 |
| JP | 63-149237 A | 6/1988 |
| JP | 04-078625 A | 3/1992 |
| JP | 2798794 B2 | 9/1998 |

OTHER PUBLICATIONS

Office Action received for Chinese Patent Application No. 201911249364.2, dated Nov. 9, 2021, 16 pages (9 pages of English Translation and 7 pages of Office Action).

Office Action received for DE Patent Application No. 102019129798.2, dated Dec. 23, 2021, 10 pages (5 pages of English Translation and 5 pages of Office Action).

* cited by examiner

150

170

METHOD FOR CONTROLLING VEHICLE SEAT

CROSS-REFERENCE TO RELATED APPLICATIONS

This application claims the benefit under 35 U.S.C. 119(a) of Korean Patent Application No. 10-2018-0164003 filed on Dec. 18, 2018 in the Korean Intellectual Property Office, the entire disclosure of which is incorporated herein by reference for all purposes.

BACKGROUND

1. Field

The present disclosure relates to a method of controlling a vehicle seat, and more particularly, to a method of controlling a vehicle seat for controlling the operation of the vehicle seat according to the switch information input for each angle section of the vehicle seat.

2. Description of Related Art

In general, in a vehicle, seats are provided for occupants to sit, such as a driver's seat and passenger seats. The position, the angle, and the inclination of the back of the seat can be controlled according to the physical condition of the occupant.

Such a method of controlling the seat includes a manual method in which an occupant manually controls the seat by force in a state in which the latching state is released manually, and an electrically-powered method in which the seat is controlled by driving a motor with a simple button operation by an occupant.

In particular, the electric seat (power seat) to which the electrically-powered controlling method is applied has a slide controlling function for advancing or reversing the seat, a tilt controlling function for controlling the front inclination angle of the seat, a height controlling function for controlling the height of the seat, and a recliner function to control the angle of the back of the seat.

When the electrically-powered seat is applied to the driver's seat, the driver may be in a dangerous situation while driving due to unintentional operation of the seat because of a control error or an internal failure of the electric seat of the driver's seat.

For example, if the driver's seat unintentionally moves rearward while driving, the driver's position becomes uncomfortable, making it difficult to drive safely, or the driver's seat is folded forward while driving, causing the driver to drive in discomfort position.

SUMMARY

In accordance with an example of the present disclosure, a method of controlling a vehicle seat includes: analyzing, by a controller 180, input information transmitted through each switch mounted in a vehicle and classifying the input information according to an input pattern; detecting, by the controller 180, in which angle range among the plurality of angle ranges belongs the current angle of the seat by analyzing rotation angle information transmitted through the angle detecting sensor of the seat; controlling, by the controller 180, an operation of the seat by using the information of the detected angle range and the input information; and judging, by the controller 180, whether the operation of the corresponding seat is correct.

In the method of controlling the vehicle seat according to an example of the present disclosure, the input information includes: a first input information A1 of the seat reclining switch 141 of the second row which the seat reclining switch 141 of the second row is pressed forward for less than 1 second, a second input information A2 of the seat reclining switch 141 of the second row which the seat reclining switch 141 of the second row is pressed rearward for less than 1 second, a third input information A3 of the seat reclining switch 141 of the second row which the seat reclining switch 141 of the second row is pressed forward for more than 1 second, a fourth input information A4 of the seat reclining switch 141 in the second row which the seat reclining switch 141 of the second row is pressed rearward for more than 1 second, a first input information B1 of the seat tilt switch 142 of the second row which the seat tilt switch 142 of the second row is pressed upwards, a second input information B2 of the seat tilt switch 142 of the second row which the seat tilt switch 142 of the second row is pressed downward, a first input information C1 of the seat cushion switch 130 of the second row which the seat cushion switch 130 is pressed in the seven-seater vehicle, a second input information C2 of the seat cushion switch 130 of the second row which the seat cushion switch 130 of the second row is pressed in the 5-seater vehicle, and an input information D of the second row seat back switch 150 which the seat back switch 150 of the second row is pressed, and an input information E of the folding switch 170 which the folding switch 170 is pressed.

In the method of controlling the vehicle seat according to an example of the present disclosure, the angle range includes a first angle range I and a second angle range II and a third angle range III from the folded state of the seat back to the cushion (0°) to the angle of the reference position O, and a fourth angle range IV from the angle of the reference position O to the obtuse angle of the rear side.

In the method of controlling the vehicle seat according to an example of the present disclosure, the performance of the operation of the seat includes: a forward recline operation for pulling the seat forward, a rearward recline operation for leaning the seat rearward, tilt-up operation for increasing the front inclination angle of the seat, the tilt-down operation for lowering the front inclination angle of the seat, walk-in operation for sliding the entire seat forward, unwalk-in operation for sliding the seat rearward, a folding operation for completely folding the seat back of the seat into the cushion and an unfolding operation for flipping the seat back of the corresponding seat from the cushion.

In the method of controlling the vehicle seat according to an example of the present disclosure, judging, by the controller 180, whether the operation for the corresponding seat is correct or not is performed by using the angle information received from the angle detecting sensor of the corresponding seat. The features and advantages of the present disclosure will become more apparent from the following detailed description based on the accompanying drawings.

Prior to this, the terms or words used in this specification and claims should not be interpreted in a conventional, lexical sense, and the inventors will appropriately define the concept of terms in order to best explain their disclosure in the best way possible. It should be interpreted as meaning

DETAILED DESCRIPTION

Figure 1:
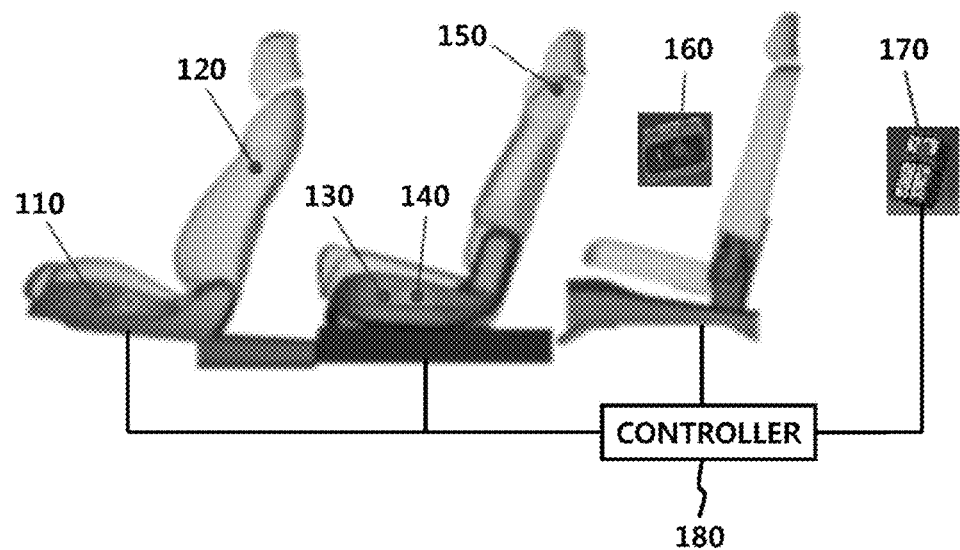
FIG. 1 is an exemplary view for a control system of a vehicle seat according to an example of the present disclosure.

The objects, specific advantages and novel features of the present disclosure will become more apparent from the following detailed description and preferred examples in conjunction with the accompanying drawings. In the present specification, in adding reference numerals to the elements of each drawing, it should be noted that the same elements have the same number as possible, even if displayed on different drawings. In addition, terms such as first and second may be used to describe various elements, but the elements should not be limited by the terms. The terms are used only for the purpose of distinguishing one element from another. In addition, in describing the present disclosure, if the detailed description of the related known technology may unnecessarily obscure the subject matter of the present disclosure, the detailed description thereof will be omitted.

The present disclosure has been provided to solve the above problems, an object of the present disclosure is to provide a method of controlling a vehicle seat for controlling the operation of the vehicle seat according to the switch information input for each angle section of the vehicle seat.

Hereinafter, exemplary examples of the present disclosure will be described in detail with reference to the accompanying drawings. FIG. 1 is an exemplary view for explaining a control system of a vehicle seat according to an example of the present disclosure, FIG. 2 is an exemplary view showing switches provided in the second row seat cushion of the vehicle according to an example of the present disclosure, FIG. 3 is an exemplary view of a switch provided in the second row of vehicle seat back according to an example of the present disclosure, FIG. 4 is an exemplary view of switches provided in the trunk portion of the vehicle according to an example of the present disclosure.

The control system for a vehicle seat according to an example of the present disclosure includes, for example, as shown in FIG. 1, switches mounted in a seven-seater vehicle, that is, a switch 110 mounted in a seat cushion in a first row, a switch 120 mounted in a seat back of a first row, switches 130, 140 mounted in the seat cushion of the second row, a switch 150 mounted in the seat back of the second row, a switch 160 mounted in the door of the third row and a folding switch 170 mounted in the trunk portion, the angle detecting sensors mounted inside each seat, and a controller 180 which is connected to the switches as well as the angle detecting sensors to control the operation of each seat.

Figure 2:
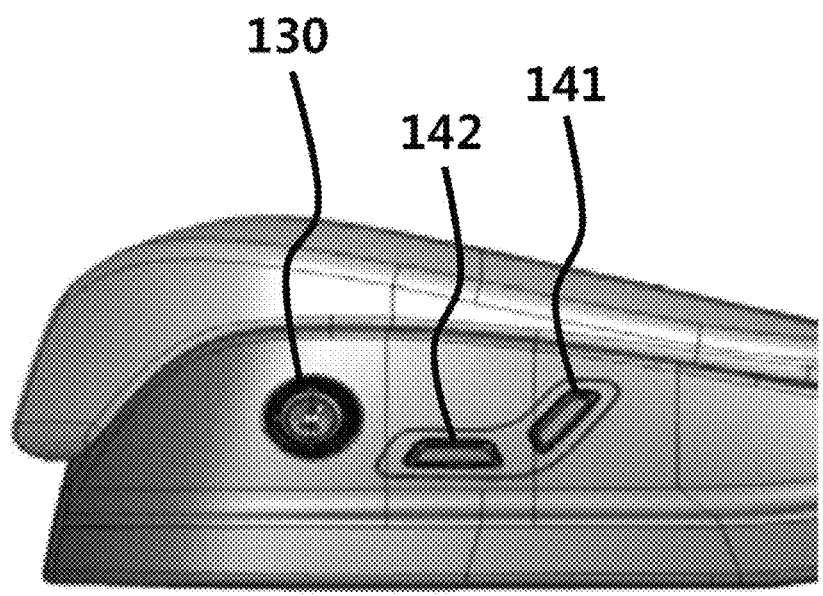
FIG. 2 is an exemplary view showing the switches provided in the second row of vehicle seat cushion according to an example of the present disclosure.
Figure 3:
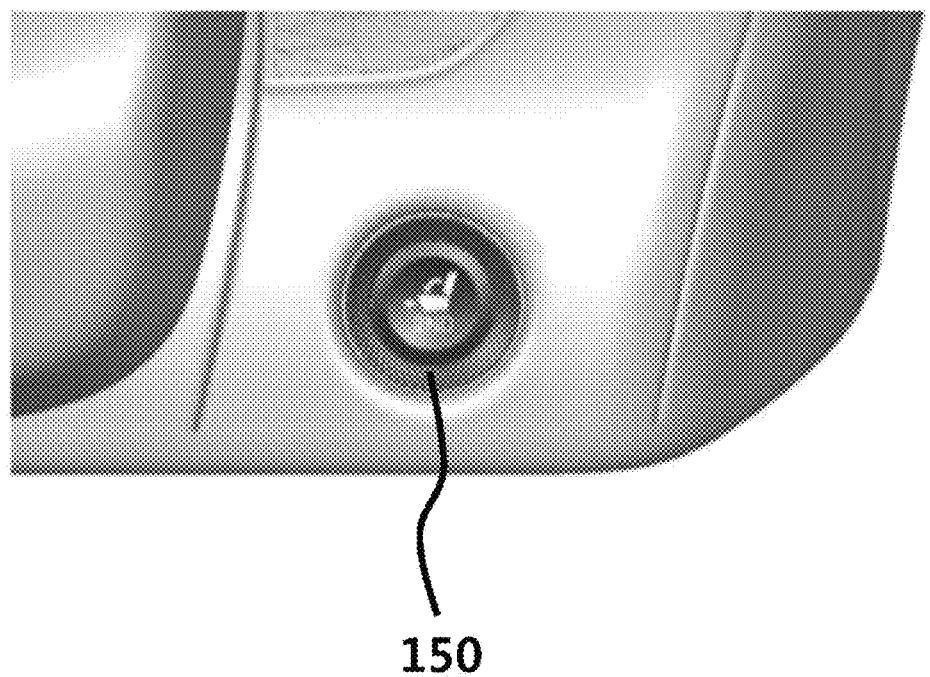
FIG. 3 is an exemplary view showing a switch provided in the second row of vehicle seat back according to an example of the present disclosure.
Figure 4:
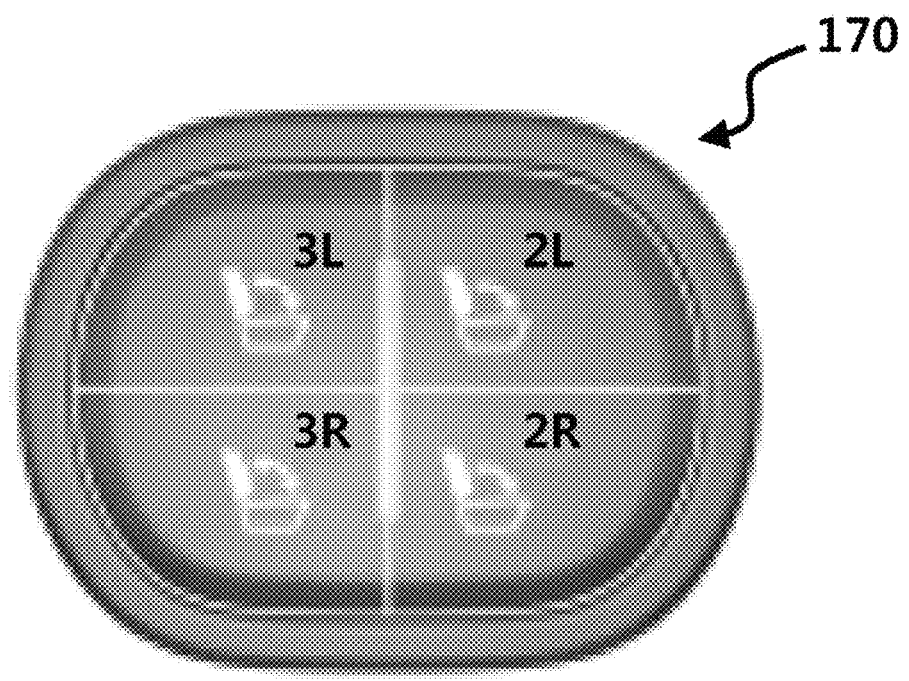
FIG. 4 is an exemplary view showing a switch provided in the trunk portion of the vehicle according to an example of the present disclosure.

In particular, the switches mounted in the seat cushions of the second row shown in FIGS. 2 and 3 may include a seat cushion switch 130 of the second row, a seat reclining switch 141 of the second row, a seat tilt switch 142 of the second row, and a switch 150 mounted in the seat back of the second row. Also included is a folding switch 170, mounted in the trunk portion shown in FIG. 4, for inputting a folding and unfolding of the seat of the second row and the seat of the third row. Each of the switches detects the input information differently according to the input pattern of the user, and transmits the input information to the controller 180.

The angle detecting sensor is connected to a motor (not shown) mounted inside each seat, including a hall sensor for example, and detects the rotation angle information of the seat according to the rotation of the motor and transmits it to the controller 180.

The controller 180, connected to a plurality of switches and angle detecting sensors, analyzes the rotation angle information transmitted through each of the angle detecting sensors to detect the current angle of the seat, analyzes the input information transmitted from the switch of the corresponding seat, and analyzes the analyzed input information as the seat motion information according to the current angle of the seat to control the operation of the seat.

Figure 5:
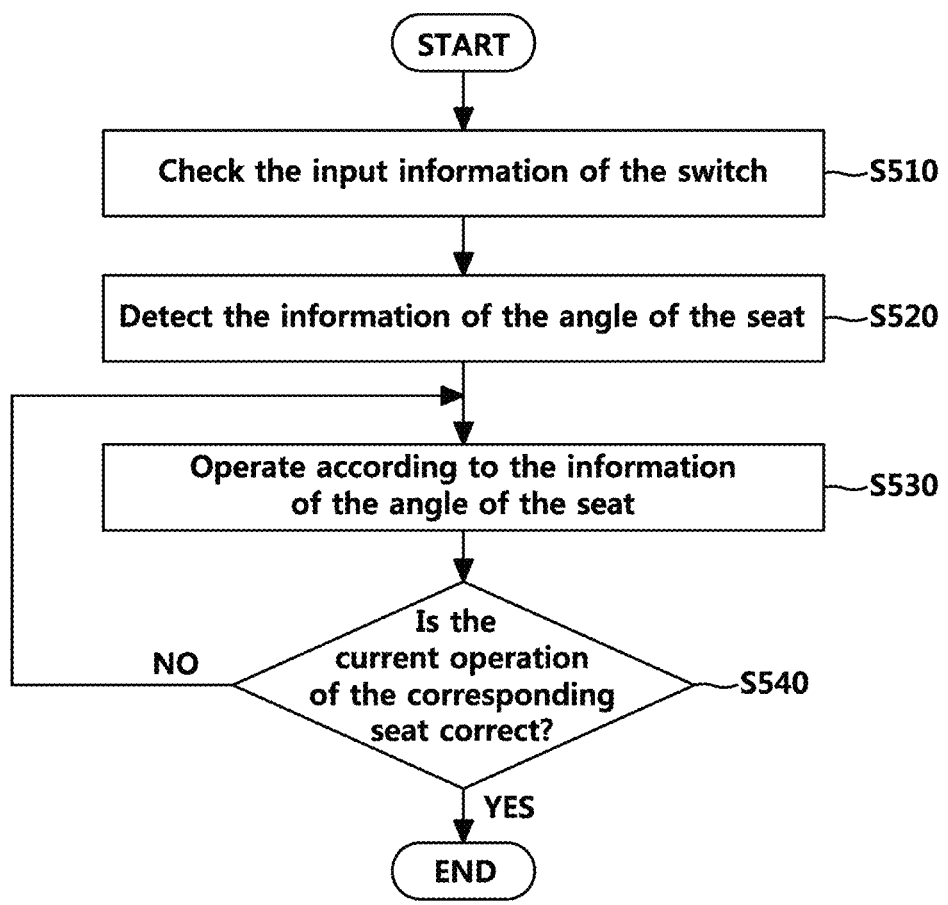
FIG. 5 is a flowchart illustrating a method of controlling a vehicle seat according to an example of the present disclosure.
Figure 6:
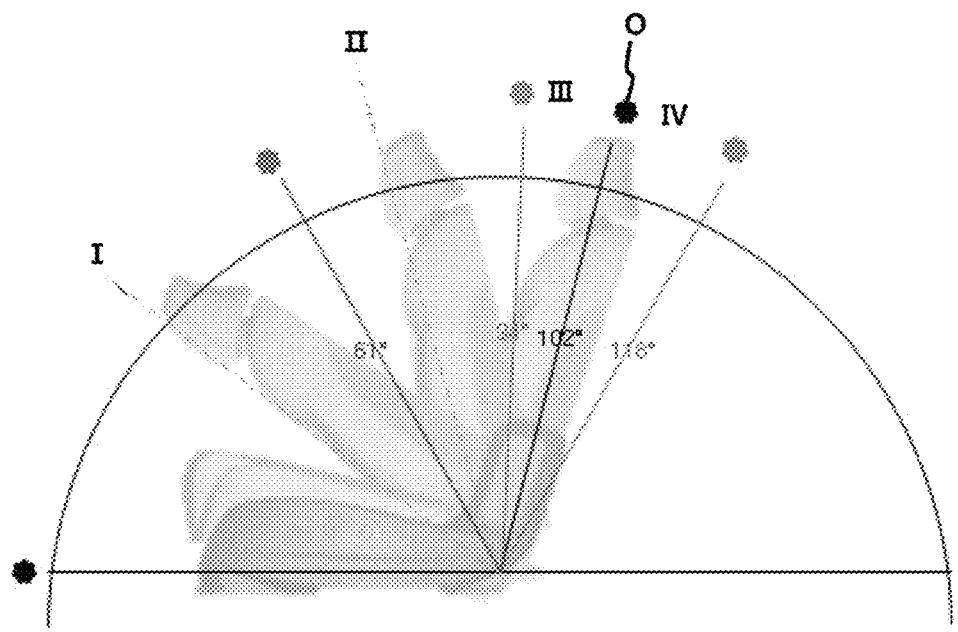
FIG. 6 is an exemplary view for explaining a method of controlling a vehicle seat according to an example of the present disclosure.

Hereinafter, a method of controlling a vehicle seat according to an example of the present disclosure will be described with reference to FIGS. 5 and 6. FIG. 5 is a flowchart illustrating a method of controlling a vehicle seat according to an example of the present disclosure, and FIG. 6 is an exemplary view for a method of controlling a vehicle seat according to an example of the present disclosure.

In the method of controlling the vehicle seat according to an example of the present disclosure, first, the controller 180 analyzes the input information transmitted through each of the switches mounted in the vehicle and classifies the input information according to the input pattern S510.

For example, the controller 180 may classify and check each of a first input information A1 of the seat reclining switch 141 of the second row which the seat reclining switch 141 of the second row is pressed forward for less than 1 second, a second input information A2 of the seat reclining switch 141 of the second row which the seat reclining switch 141 of the second row is pressed rearward for less than 1 second, a third input information A3 of the seat reclining switch 141 of the second row which the seat reclining switch 141 of the second row is pressed forward for more than 1 second, a fourth input information A4 of the seat reclining switch 141 in the second row which the seat reclining switch 141 of the second row is pressed rearward for more than 1 second, a first input information B1 of the seat tilt switch 142 of the second row which the seat tilt switch 142 of the second row is pressed upwards, a second input information B2 of the seat tilt switch 142 of the second row which the seat tilt switch 142 of the second row is pressed downward, a first input information C1 of the seat cushion switch 130 of the second row which the seat cushion switch 130 is pressed in the seven-seater vehicle, a second input information C2 of the seat cushion switch 130 of the second row which the seat cushion switch 130 of the second row is pressed in the 5-seater vehicle, and an input information D of the second row seat back switch 150 which the seat back switch 150 of the second row is pressed, and an input information E of the folding switch 170 which the folding switch 170 is pressed.

After classifying the input information, the controller 180 analyzes the rotation angle information transmitted through the angle detecting sensor of the corresponding seat and detects the current angle of the seat (S520) is located in which angle range of the set angle range.

Specifically, as shown in FIG. 6, the angles in which the rotation angles of the seats are classified as, for example, a first angle range I which is from the state in which the seat back is completely folded to the cushion (0°) to the reference position O, a second angle range II and a third angle range III, and a fourth angle range IV from the reference position O to the obtuse angle at the rear side.

The first angle range I preferably has an angle range from the state which the seat back is fully folded to the cushion 0° to 61°, the second angle range II preferably has an angle range from 61° to 94°, the third angle range III preferably has an angle range from 94° to the reference position O which is 102°, and the fourth angle range IV preferably has 102° which is the reference position O to 118°.

Based on the angle range, the controller 180 analyzes the rotation angle information transmitted through the angle detecting sensor of the corresponding seat to detect in which angle range of the set angle ranges I, II, III, IV belongs the current angle of the seat. The angle range is set to four ranges, but is not limited thereto, and may be set to less than three or more than five angle ranges.

Using the information of the detected angle range and the input information, the controller 180 performs an operation of the corresponding seat S530.

Specifically, the operation of the seat may be classified as a forward recline operation for pulling the seat forward, a rearward recline operation for leaning the seat rearward, tilt-up operation for increasing the front inclination angle of the seat, the tilt-down operation for lowering the front inclination angle of the seat, walk-in operation for sliding the entire seat forward, unwalk-in operation for sliding the seat rearward, a folding operation for completely folding the seat back of the seat into the cushion and an unfolding operation for flipping the seat back of the corresponding seat from the cushion.

These operations of the seat are judged by the controller 180 as shown in Table 1 below, using the angle range information and the input information inputted through the switch to perform the operation of the seat.

TABLE 1

| Input | I | II | III | IV |
|---|---|---|---|---|
| A1 | — | — | recline-forward operation | recline-forward operation |
| A2 | — | — | recline-rearward operation | recline-rearward operation |
| A3 | folding operation | folding operation | recline-forward operation | recline-forward operation |
| A4 | unfolding operation | unfolding operation | recline-rearward operation | recline-rearward operation |
| B1 | — | — | tilt-up operation | tilt-up operation |
| B2 | — | — | tilt-down operation | tilt-down operation |
| C1 | walk-in operation | unwalk-in operation | walk-in operation | walk-in operation |
| C2 | unfolding operation | unfolding operation | folding operation | folding operation |
| D | walk-in operation | unwalk-in operation | walk-in operation | walk-in operation |

TABLE 1-continued

| Input | I | II | III | IV |
|---|---|---|---|---|
| E | unfolding operation | unfolding operation | folding operation | folding operation |

For example, when the controller 180 in the 5-seater vehicle receives the first input information C2 of the seat cushion switch 130 of the second row which the seat cushion switch 130 of the second row is pressed as well as the angle range information from angle detecting sensor mounted in the seat of the second row indicating that the seat of the second row is located in the third angle range Ill which is from 94° to 102° which is the design reference position O, the controller 180 performs the folding operation which the seat back of the second row is folded completely to the cushion according to the first input information C2 of the seat cushion switch 130 of the second row and the angle range information indicating that it is located in the third angle range III.

As the operation of the seat is performed as described above, the controller 180 judges whether the operation of the seat is correct or not S540.

For example, as the controller 180 performs the folding operation of completely folding the seat back of the second row to the cushion according to the first input information C2 of the seat cushion switch 130 of the second row as well as the angle range information that it is located in the third angle range Ill, the change of the angle of the seat back of the second row according to the folding operation may be detected by receiving the angle information from the angle detecting sensor mounted in the seat of the second row.

Accordingly, upon detecting the change of the angle of the seat back of the second row, the controller 180 judges that the folding operation of folding the seat back of the second row into the cushion is properly performed, and the operation may be continued to finish.

On the contrary, if the change of angle of the seat back of the second row is not detected, the controller 180 may judge that the folding operation of folding the seat back of the second row into the cushion is not properly performed and display an error message.

The method of controlling the vehicle seat according to an example of the present may improve the reliability of the vehicle by preventing the user's misrecognition and malfunction because the operation of each seat is classified and controlled by using the set angle range information of the seat according to the set angle range (I, II, III, IV) and the input information transmitted through the switch.

Although the technical spirit of the present disclosure has been described in detail according to the above-described preferred example, it should be noted that the above-described examples are for the purpose of description and not for limitation.

In addition, those skilled in the art will understand that various implementations are possible within the scope of the technical idea of the present disclosure.

What is claimed is:

1. A method of controlling a vehicle seat, in a vehicle with multiple seats, comprising:
analyzing, by a controller, input information transmitted through each switch mounted in a vehicle and classifying the input information according to an input pattern;
detecting, by the controller, in which an angle range among a plurality of angle ranges belongs a current angle of the seat by analyzing rotation angle information transmitted through an angle detecting sensor of a corresponding seat;

controlling, by the controller, an operation of the corresponding seat by using the information of the detected angle range and the input information; and determining, by the controller, whether the operation of the corresponding seat is correct or not, wherein the input information comprises:

a first input information A1 of a seat reclining switch of a second row when the seat reclining switch of the second row is pressed forward for less than 1 second, a second input information A2 of the seat reclining switch of the second row which the seat reclining switch of the second row is pressed rearward for less than 1 second, a third input information A3 of the seat reclining switch of the second row which the seat reclining switch of the second row is pressed forward for more than 1 second, a fourth input information A4 of the seat reclining switch of the second row which the seat reclining switch of the second row is pressed rearward for more than 1 second, a first input information B1 of a seat tilt switch of the second row which the seat tilt switch of the second row is pressed upwards, a second input information B2 of the seat tilt switch of the second row which the seat tilt switch of the second row is pressed downwards, a first input information C1 of a seat cushion switch of the second row which the seat cushion switch is pressed in a seven-seater vehicle, a second input information C2 of the seat cushion switch of the second row which the seat cushion switch of the second row is pressed in a five-seater vehicle, an input information D of a second row seat back switch which a seat back switch of the second row is pressed, and an input information E of a folding switch which the folding switch is pressed, wherein the angle range comprises:

a first angle range I, a second angle range II and a third angle range III from a folded state of a seat back to a cushion(0°) to an angle of a reference position O, and a fourth angle range IV from the angle of the reference position O to an obtuse angle of a rear side.

2. The method of claim 1, wherein a performance of the operation of the corresponding seat comprises:

a forward recline operation for pulling the corresponding seat forward, a rearward recline operation for leaning the corresponding seat rearward, a tilt-up operation for increasing a front inclination angle of the corresponding seat, a tilt-down operation for lowering the front inclination angle of the corresponding seat, a walk-in operation for sliding the entire corresponding seat forward, an unwalk-in operation for sliding the corresponding seat rearward, a folding operation for completely folding a seat back of the corresponding seat into a cushion and an unfolding operation for flipping the seat back of the corresponding seat from the cushion.

3. The method of claim 1, wherein judging, by the controller, whether the operation of the corresponding seat is correct or not is performed by using the angle information received from the angle detecting sensor of the corresponding seat.

* * * * *